US009578218B2

(12) United States Patent
Topliss

(10) Patent No.: US 9,578,218 B2
(45) Date of Patent: Feb. 21, 2017

(54) COMB DRIVE AND LEAF SPRING CAMERA ACTUATOR

(71) Applicant: Apple Inc., Cupertino, CA (US)

(72) Inventor: Richard J. Topliss, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/043,915

(22) Filed: Feb. 15, 2016

(65) Prior Publication Data

US 2016/0165103 A1 Jun. 9, 2016

Related U.S. Application Data

(63) Continuation of application No. 14/293,960, filed on Jun. 2, 2014, now Pat. No. 9,264,591.

(51) Int. Cl.
| | |
|---|---|
| *H04N 5/228* | (2006.01) |
| *H04N 5/225* | (2006.01) |
| *G03B 17/56* | (2006.01) |
| *H04N 5/232* | (2006.01) |
| *H04N 5/335* | (2011.01) |

(52) U.S. Cl.
CPC .......... *H04N 5/2253* (2013.01); *G03B 17/561* (2013.01); *H04N 5/23287* (2013.01); *H04N 5/335* (2013.01)

(58) Field of Classification Search
CPC ............ H04N 5/23248; H04N 5/23258; H04N 5/23251; H04N 5/2328; G03B 2217/005; G03B 2205/0007; G03B 2205/0038; G03B 2205/0061; G03B 2205/0069; G03B 2205/0084; G03B 2205/0076; G03B 2205/0092; G03B 2205/0046; G03B 2205/0053; G02B 27/646; G02B 27/644

USPC .......... 348/208.1–208.99, 373, 374
See application file for complete search history.

(56) References Cited

U.S. PATENT DOCUMENTS

| | | | |
|---|---|---|---|
| 5,891,564 A * | 4/1999 | Shultz | B29C 43/222 428/324 |
| 8,138,564 B2 | 3/2012 | Kosaka et al. | |
| 2004/0223204 A1 | 11/2004 | Mao et al. | |
| 2007/0091415 A1 | 4/2007 | Tsuboi et al. | |
| 2010/0045141 A1 | 2/2010 | Pulskamp et al. | |
| 2012/0081598 A1 | 4/2012 | Calvet et al. | |

(Continued)

OTHER PUBLICATIONS

U.S. Appl. No. 14/293,960, filed Jun. 2, 2014, Richard J. Topliss.

*Primary Examiner* — Chia-Wei A Chen
(74) *Attorney, Agent, or Firm* — Robert C. Kowert; Meyertons, Hood, Kivlin, Kowert & Goetzel, P.C.

(57) ABSTRACT

An actuator package includes a base frame member and an image sensor. The actuator package further includes a plurality of comb drive actuators affixed to the base frame member by a plurality of respective electrically conductive leaf spring flexures. The respective electrically conductive leaf spring flexures provide an electrical current conductive path between the image sensor and conductors mounted on the base frame member, and the plurality of comb drive actuators is arranged to control the motion of the image sensor in multiple degrees of freedom relative to the fixed structure. Each of the plurality of comb drive actuators includes at least two independent comb drive array portions. At least one of the comb drive array portions generates force tending to move the image sensor out of a plane of the base frame member.

19 Claims, 13 Drawing Sheets

(56) References Cited

U.S. PATENT DOCUMENTS

| | | |
|---|---|---|
| 2012/0119324 A1* | 5/2012 | Jain .................. G03B 3/10 257/508 |
| 2012/0119614 A1 | 5/2012 | Gutierrez |
| 2012/0120308 A1 | 5/2012 | Gutierrez et al. |
| 2013/0076919 A1 | 3/2013 | Gutierrez et al. |
| 2013/0077945 A1 | 3/2013 | Liu et al. |
| 2013/0201392 A1 | 8/2013 | Gutierrez |
| 2013/0215325 A1 | 8/2013 | Calvet et al. |
| 2013/0279030 A1 | 10/2013 | Calvet et al. |
| 2014/0028897 A1 | 1/2014 | Azuma |
| 2014/0285905 A1 | 9/2014 | Zhou et al. |
| 2014/0300942 A1 | 10/2014 | Van Lierop et al. |
| 2014/0354856 A1* | 12/2014 | Zhou .................. G03B 5/02 348/240.3 |
| 2015/0131000 A1 | 5/2015 | Ryou |
| 2015/0146312 A1 | 5/2015 | Gutierrez et al. |
| 2015/0201127 A1 | 7/2015 | Ahn |
| 2016/0227117 A1* | 8/2016 | Gutierrez .................. G03B 3/10 |

* cited by examiner

`US 9,578,218 B2`

COMB DRIVE AND LEAF SPRING CAMERA ACTUATOR

This application is a continuation of U.S. patent application Ser. No. 14/293,960, filed Jun. 2, 2014, now U.S. Pat. No. 9,264,591, which is hereby incorporated by reference herein in its entirety.

BACKGROUND

Technical Field

This disclosure relates generally to control of the motion of camera components.

Description Or Related Art

For high-end computing devices, it is common to incorporate miniature cameras. One typical feature augmentation for such miniature cameras is autofocus (AF). The incumbent actuator technology for such cameras is the voice coil motor (VCM). Many other technologies have been proposed, with varying strengths and weaknesses and differing degrees of commercial success. The voice coil motor technology has the key advantage of being simple, and therefore being straightforward to design.

While there are several disadvantages of voice coil motor, such as high power, and low relative force, their use persists in spite of the associated costs.

Demands on improvements to performance of such miniature cameras are constant, as are demands for continued miniaturization, given the added features and devices added to such mobile devices.

In particular, demands to decrease the dimensions of camera components and demands for high image quality continue to create an ongoing desire for camera components that exhibit superior performance as measured in various ways, while consuming less space and energy.

SUMMARY OF EMBODIMENTS

Some embodiments provide an actuator package that includes a base frame member and an image sensor. The actuator package further includes a plurality of comb drive actuators affixed to the base frame member by a plurality of respective electrically conductive leaf spring flexures. The respective electrically conductive leaf spring flexures provide an electrical current conductive path between the image sensor and conductors mounted on the base frame member, and the plurality of comb drive actuators is arranged to control the motion of the image sensor in multiple degrees of freedom relative to the fixed structure. Each of the plurality of comb drive actuators includes at least two independent comb drive array portions. At least one of the comb drive array portions generates force tending to move the image sensor out of a plane of the base frame member.

Figure 1:
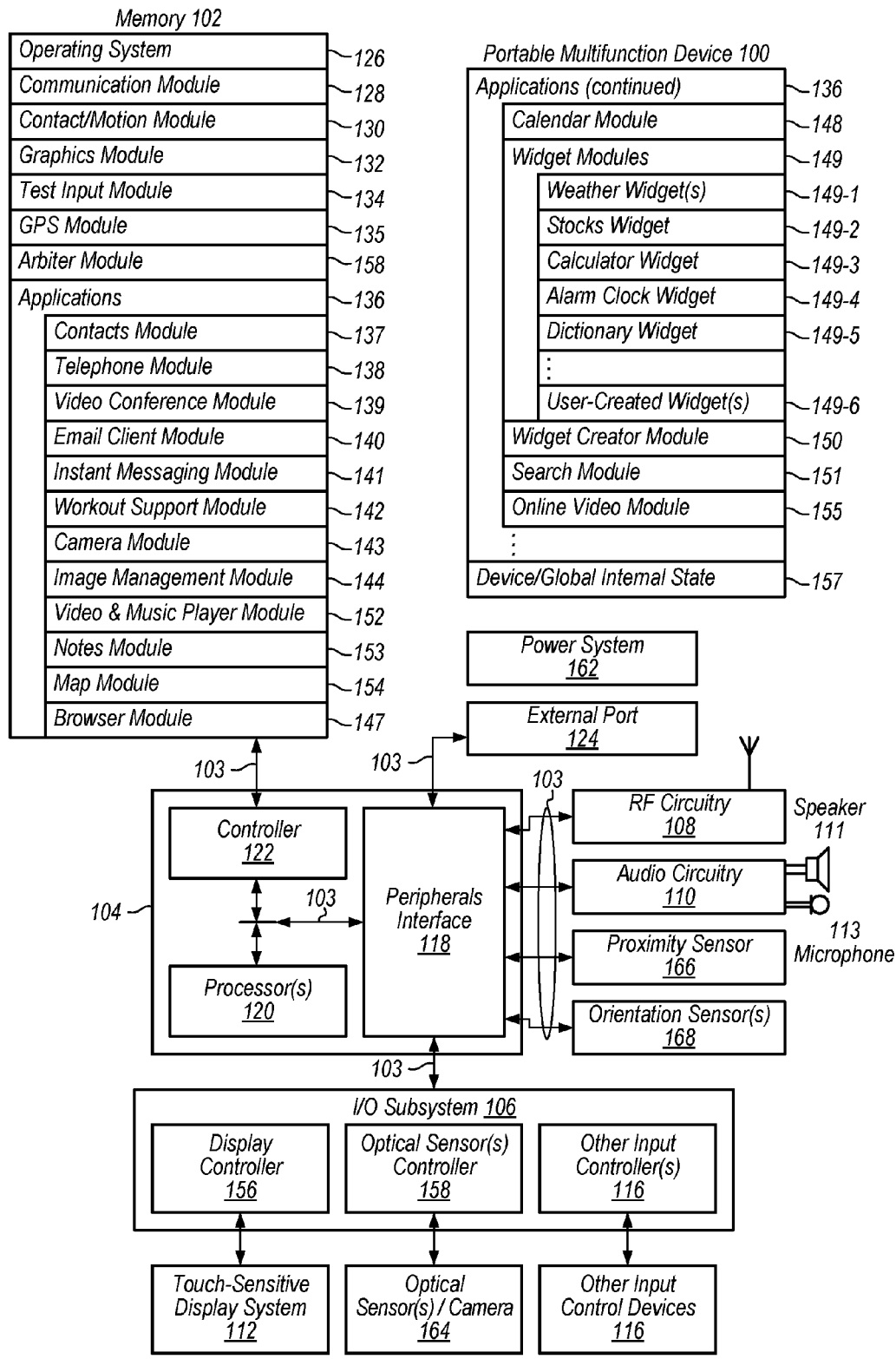
FIG. 1 illustrates a block diagram of a portable multifunction device with a camera in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values.

The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments provide an actuator package for camera control that includes a base frame member and an image sensor. The actuator package further includes a plurality of comb drive actuators affixed to the base frame member by a plurality of respective electrically conductive leaf spring flexures. The respective electrically conductive leaf spring flexures provide an electrical current conductive path between the image sensor and conductors mounted on the base frame member, and the plurality of comb drive actuators is arranged to control the motion of the image sensor in multiple degrees of freedom relative to the fixed structure. Each of the plurality of comb drive actuators includes at least two independent comb drive array portions. At least one of the comb drive array portions generates force tending to move the image sensor out of a plane of the base frame member.

Some embodiments are configured to move the image sensor instead of the lens to achieve the required actuation functions in the camera. Moving the image sensor in linear directions orthogonal to the optical axis represents two degrees of freedom of motion (which can be labeled the X and Y directions). These linear motions compensate for angular tilting changes in the camera position from the user handshake (typically called 'pitch' and 'yaw' tilts).

Although in practice a little less important, it is also valuable to rotate the image sensor about the optical axis to compensate for 'roll' tilts from the user's handshake. Compensating this degree of freedom becomes more valuable for more wide-angle lenses, as the corners of the image away from the optical axis are more prone to roll blur. In addition, as may be appreciated, the autofocus function benefits from relative movement between one of more lens elements and the image sensor along the optical axis. For some embodiments, one of skill in the art will appreciate in light of having read the present disclosure that this is achieved by moving the image sensor along the optical axis.

Finally, one of the main sources of image degradation in miniature cameras is relative tilt between the image sensor and the lens, such that not all of the image sensor can be positioned at the image plane of the lens at the same time. This leads to blurring of the images at the sides and corners. This is typically combated during camera manufacture to minimize all the tolerances in the stack that determines side lens tilt. However typical lens tilt specifications are around 3 to 6 arc minutes, which corresponds to tolerances of 7 to 15 um across the surface of the image sensor. This tolerance being split between the lens, actuator and image sensor substrate tolerances, and then the final integration processes, where the lens assembly is bonded to the image sensor assembly. Some embodiments address this issue by incorporating these two extra tilt degrees of freedom to the actuator package.

This means that some embodiments include an actuator package that can move the image sensor relative to the lens in all six degrees of freedom: along three orthogonal linear axes, and three rotations about the same axes. The MEMS (Microelectromechanical systems) technology of the comb actuator components of some embodiments enables a compact actuator package to deliver such movement flexibility. Moreover, the MEMS technology, being a Silicon device is relatively easy to integrate with the Silicon image sensor. In some embodiments, it is possible to integrate the actuator onto the same piece of Silicon as the image sensor. Less ambitiously, the Silicon MEMS device may make use of wafer bonding processes to join to the image sensor wafter and route the electrical connections through the moving MEMS structure to the surrounding fixed Silicon frame of the MEMS device, that may then be integrated in one of several ways to a substrate to mechanically mount and electrically route the electrical connections to other devices and in the camera, and to the wider system outside the camera.

Some embodiments include an actuator assembly for mounting a digital image sensor. A base frame member is articulated to a digital image sensor using a plurality of comb drive actuators affixed to the base frame member by a plurality of respective electrically conductive leaf spring flexures. The respective electrically conductive leaf spring flexures provide an electrical current conductive path between the image sensor and conductors mounted on the base frame member, and the plurality of comb drive actuators is arranged to control the motion of the image sensor in multiple degrees of freedom relative to the fixed structure. In some embodiments, each of the plurality of comb drive actuators includes at least two independent comb drive array portions. At least one of the comb drive array portions generates force tending to move the image sensor out of a plane of the base frame member, and another of the comb drive array portions generates force tending to move the image sensor in one linear direction within the plane of the base frame member.

In some embodiments, each of the four functionally similar comb drive actuator structures includes a substantially rigid portion with interdigitated comb drive fingers from the respective at least one of the comb drive arrays and the respective another of the comb drive arrays. In some embodiments, for each of the plurality of comb drive actuators, a moving portion of the comb drive actuator that delivers in-plane force is suspended on a moving portion of the comb drive actuator that delivers out-of plane forces. Some embodiments include plurality of substantially rigid portions of the actuator assembly suspended using resilient flexures to the base frame member, each of which suspends a respective another of the comb drive array portions to deliver out-of-plane forces.

In some embodiments, the plurality of substantially rigid portions are deflected out of the plane of the plane of the base frame member during the fabrication process, and the plurality of substantially rigid portions are bonded in deflected positions so as to deflect the respective another of the comb drive array portions to deliver the out-of-plane forces. In some embodiments, the plurality of comb drive actuators affixed to the base frame member further comprises four functionally similar comb drive actuator structures. In some embodiments, each of the comb drive actuators is linked to the image sensor by a linkage arrangement that includes a substantially rigid linking bar, and a further beam angled to the rigid bar that is compliant to one linear direction of in-plane movement and stiff to the orthogonal direction of in-plane movement. The orthogonal direction of in-plane movement is a same direction as the forces provided by the in-plane actuator to which it is attached.

Some embodiments include digital camera, or a digital camera module in a multifunction device. In some embodiments, the digital camera module includes a base frame member, an image sensor, and a plurality of comb drive actuators affixed to the base frame member by a plurality of respective electrically conductive leaf spring flexures. Each of the plurality of comb drive actuators includes at least two independent comb drive array portions. At least one of the comb drive array portions generates force tending to move the image sensor out of a plane of the base frame member, and another of the comb drive array portions generates force tending to move the image sensor in one linear direction within the plane of the base frame member.

In some embodiments, the respective electrically conductive leaf spring flexures provide an electrical current conductive path between the image sensor and conductors mounted on the base frame member, and the plurality of comb drive actuators is arranged to control the motion of the image sensor in multiple degrees of freedom relative to the fixed structure. In some embodiments, each of the four functionally similar comb drive actuator structures includes a substantially rigid portion with interdigitated comb drive fingers from the respective at least one of the comb drive arrays and the respective another of the comb drive arrays.

In some embodiments, for each of the plurality of comb drive actuators, a moving portion of the comb drive actuator that delivers in-plane force is suspended on a moving portion of the comb drive actuator that delivers out-of plane forces. Some embodiments further include a plurality of substantially rigid portions of the actuator assembly suspended using resilient flexures to the base frame member, each of which suspends a respective another of the comb drive array portions to deliver out-of-plane forces. The plurality of substantially rigid portions are deflected out of the plane of the plane of the base frame member during the fabrication process, and the plurality of substantially rigid portions are bonded in deflected positions so as to deflect the respective another of the comb drive array portions to deliver the out-of-plane forces.

In some embodiments, the plurality of comb drive actuators affixed to the base frame member further comprises four functionally similar comb drive actuator structures. In some embodiments, each of the comb drive actuators is linked to the image sensor by a linkage arrangement that includes a substantially rigid linking bar, and a further beam angled to the rigid bar that is compliant to one linear direction of in-plane movement and stiff to the orthogonal direction of in-plane movement. The orthogonal direction of in-plane movement is a same direction as the forces provided by the in-plane actuator to which it is attached.

Some embodiments provide an actuator package including a base frame member, an image sensor, and a plurality of comb drive actuators affixed to the base frame member by a plurality of respective electrically conductive leaf spring flexures. The plurality of comb drive actuators includes four comb drive actuator structures. Each of the four comb drive actuator structures includes a substantially rigid portion with interdigitated comb drive fingers from the respective at least one of the comb drive arrays and the respective another of the comb drive arrays. For each of the plurality of comb drive actuator structures, a moving portion of the comb drive actuator that delivers in-plane force is suspended on a moving portion of the comb drive actuator that delivers out-of plane forces.

In some embodiments, each of the plurality of comb drive actuators includes at least two independent comb drive array portions. At least one of the comb drive array portions generates force tending to move the image sensor out of a plane of the base frame member, and another of the comb drive array portions generates force tending to move the image sensor in one linear direction within the plane of the base frame member.

Some embodiments further include a plurality of substantially rigid portions of the actuator assembly suspended using resilient flexures to the base frame member, each of which suspends a respective another of the comb drive array portions to deliver out-of-plane forces. In some embodiments, the plurality of substantially rigid portions are deflected out of the plane of the plane of the base frame member during the fabrication process.

In some embodiments, the plurality of comb drive actuators affixed to the base frame member further includes four functionally similar comb drive actuator structures. In some embodiments, each of the comb drive actuators is linked to the image sensor by a linkage arrangement that includes a substantially rigid linking bar, and a further beam angled to the rigid bar that is compliant to one linear direction of in-plane movement and stiff to the orthogonal direction of in-plane movement. The orthogonal direction of in-plane movement is a same direction as the forces provided by the in-plane actuator to which it is attached. In some embodiments, the plurality of substantially rigid portions are bonded in deflected positions so as to deflect the respective another of the comb drive array portions to deliver the out-of-plane forces.

In some embodiments, the actuator technology is the electrostatic comb drive. This works by using an array of interlocking fingers, where one half of the array is on a first substantially rigid body, and the other half is on a second substantially rigid body. The two bodies are suspended relative to each other on a series of resilient flexible leaf-springs that guide the relative motion between the two bodies. The arrangement of leaf-springs is chosen such that it is relatively compliant in desired directions of the comb, and relatively very stiff in undesired directions. For example, in some embodiments it is a necessary condition of successful operation that the leaf spring suspension prevents the interlocking comb fingers on the two bodies from ever touching each other. The comb operated by applying a voltage across the fingers on the two bodies to set up an electrostatic attraction.

In some embodiments, electric field and capacitance between comb fingers are maximized by a smaller gap between the comb fingers and a greater the surface area that the fingers overlap. In some embodiments, the comb operates restricting the comb fingers from touching under the action of the electrostatic attraction, but allowing them to increase the amount of interlock, effectively increasing the surface area of array of parallel plate capacitors that are formed by the fingers.

A relative force between the two bodies is generated by the comb array in the direction that increases the overlap between the fingers. Considering one finger on one of the bodies in the middle of the array, either side of this finger there are two overlapping fingers from the other body. As an electrical voltage is applied between the finger arrays in the two bodies, the first finger is attracted by nominally the same force to the fingers on either side. Hence nominally there is no net force on the first finger in a direction that would cause the fingers to touch. However, the equilibrium in these touching directions is unstable. Since the electrostatic attraction is inversely proportional to the square of the gap between the fingers, a small perturbation towards one fingers would see the forces no longer in equilibrium, with the net force in the direction to move the finger in the same direction as the perturbation. For this reason, the resilient leaf-spring arrangement must be relatively very stiff in directions that would lead to the fingers touching.

As a guide, in some embodiments the resilient leaf-spring arrangement is roughly 70,000 times stiffer in directions that would lead to the fingers touching as compared to the direction of desired relative motion. In some embodiments, minimizing the gap between fingers, and minimizing the width of each finger allows more fingers with a higher electric field and hence a higher force for a given applied voltage. In some embodiments, force generated from the comb drive is proportional to the number of fingers, proportional to the square of the applied voltage and inversely proportional to the gap between fingers.

Some embodiments also integrate multiple comb drives designed to generate forces in different directions to deliver a device capable of moving the image sensor in six degrees of freedom. Some embodiments are described with the aid of the accompanying drawings. Some embodiments exploit the interlocking fingers of the comb drive. Note that, in some embodiments, the fingers on the fixed side of the comb are not co-planar with the fingers on the moving side of the comb, because the generally planar structure of the actuator package is oriented in the camera with its plane orthogonal to the optical axis of the lens.

This means that for the autofocus function, the lens element, and therefore the comb drive may move out of the plane of the actuator package. It should be understood by one of ordinary skill in the art after having read the present description of embodiments that the comb drive is operated in a way that generates forces to increase the amount of interlock between the comb fingers without generating electrostatic forces that would tend to reduce the amount of interlock and force the fingers apart.

In some embodiments, it is thus advantageous for the equilibrium position of the autofocus comb to be with the two halves of the comb offset from each other along the optical axis, and then during operation by the application of a voltage across the fingers on the two halves of the comb, such that forces will be generated to pull the two halves of the comb back into alignment.

In some embodiments, a deflected portion is deflected out of the plane of the actuator package and bonded in this position to the underlying support structure and to neighboring parts of the actuator package. This deflected portion is linked to the moving body by a leaf spring flexure.

The moving body is suspended on the fixed body by means of two pairs of resilient leaf spring flexures. These resilient leaf spring flexures substantially limit the relative motion between the moving body and the fixed body to rotations about an axis. The act of deflecting the deflected portion rotates the moving body out of the plane of the actuator package. This deflected state then becomes the equilibrium position of the moving body. During operation, the application of a voltage across the two halves of the comb drive will generate forces that tend to pull the moving body back into the plane of the actuator package, rotating about the blue dashed axis.

In the illustrated embodiments, it is assumed that the actuator package and the image sensor are fabricated together from a single monolithic piece of silicon using various lithographic IC and MEMS processing techniques including etching, plating, deposition and implantation.

However, one of skill in the art will realize in light of having read the present disclosure that the included embodiments are not so limited. For manufacturing cost and yield issues, and constraints on the different required processing techniques, it may be more appropriate to fabricate the MEMS actuator separately from the image sensor and then use some kind of wafer bonding technique to join them together.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 1A is a block diagram illustrating portable multifunction device 100 with camera 164 in accordance with some embodiments. Camera 164 is sometimes called an "optical sensor" for convenience, and may also be known as or called an optical sensor system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3:
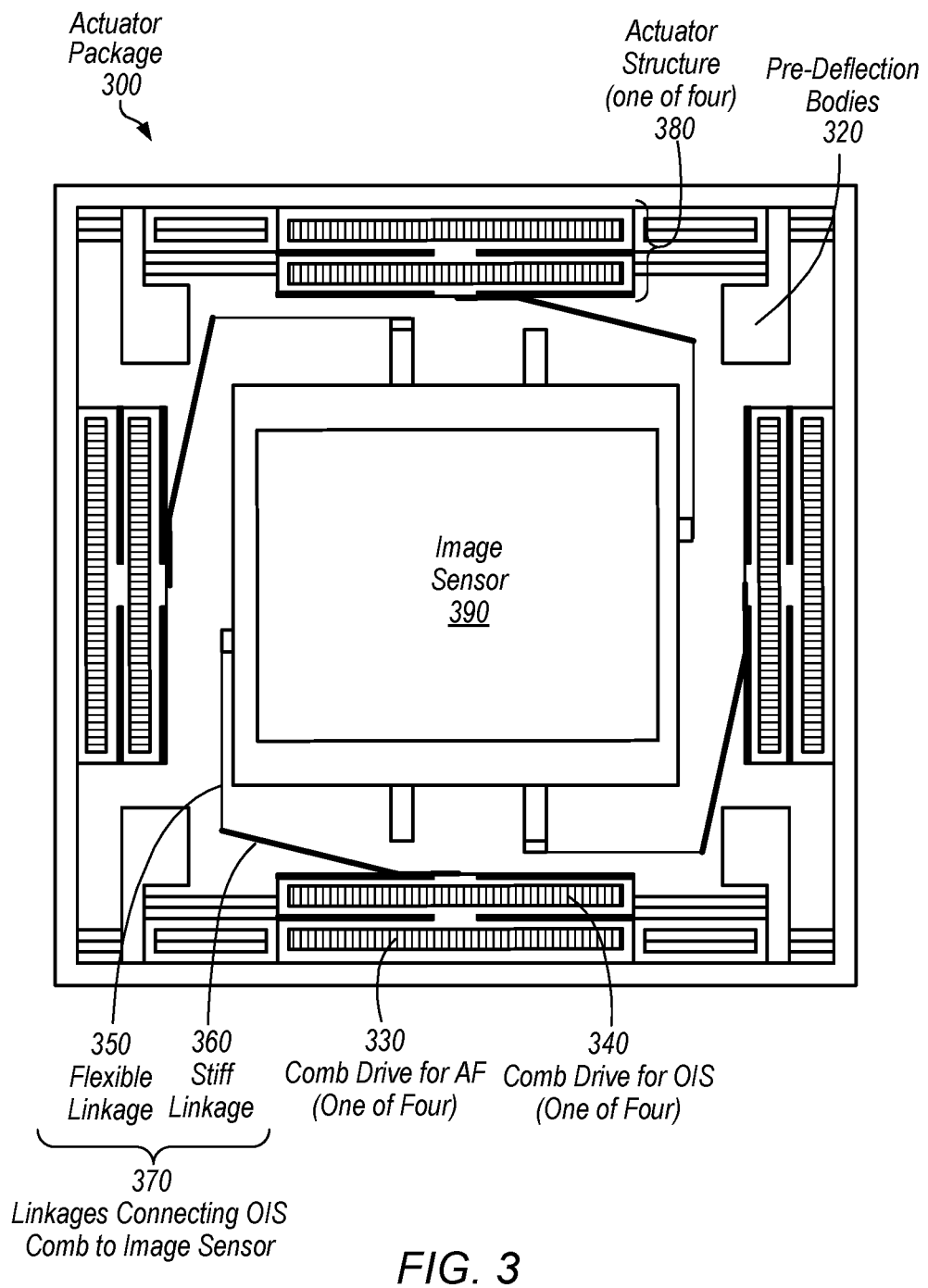
FIG. 3 illustrates a MEMS actuator for use with an image sensor according to some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video player module and a music player module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XIVIPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 2:
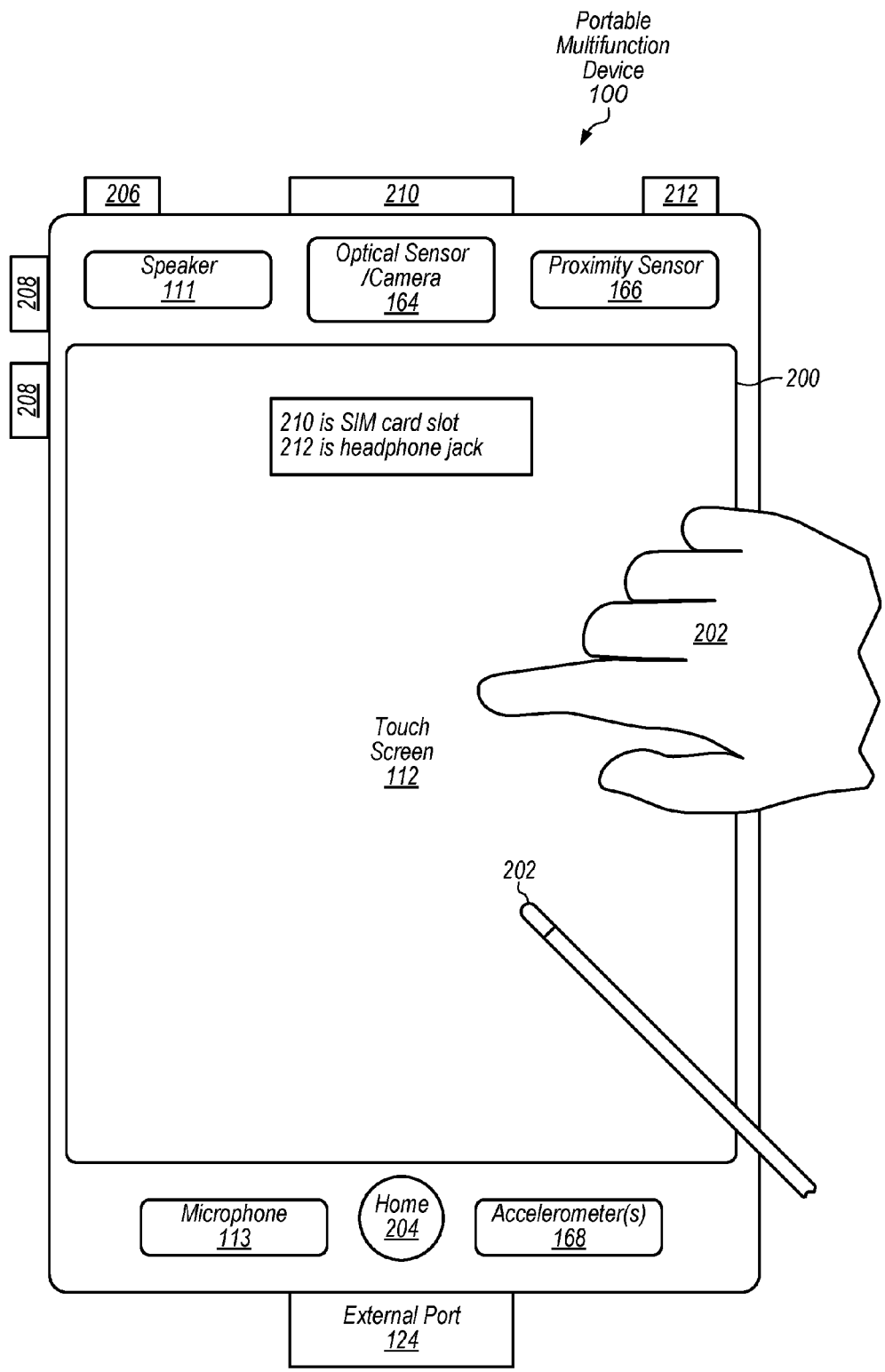
FIG. 2 depicts a portable multifunction device having a camera in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to optical sensor/camera 164 (on the front of a device), rear-facing camera or optical sensor that is pointed opposite from the display may be used instead of optical sensor/camera 164.

Camera Module of a Multifunction Device and Placement of Optical Image Stabilization (OIS) Coils FIG. 3 illustrates a MEMS actuator for use with an image sensor according to some embodiments. FIG. 3 highlights the general structures of the MEMS device labeled actuator package 300. It may be appreciated that, in some embodiments, as the actuator package 300 is controlling six axes of motion, the structures are complex. There are four similar actuator structures 380 disposed around the four sides of thei mage sensor 310. The actuator structures 380 on each of the four sides is capable of moving in two degrees of freedom. Therefore there are actually eight degrees of freedom in the whole actuator package 380. However, some embodiments are structured such that two of these are not as useful as the remaining six and can lead to internal stresses in the structure if not controlled correctly, leading some embodiments to control those two degrees of freedom as discussed below.

As is illustrated in FIG. 3, the actuator structures 380 on each side of the image sensor 310 have two comb drives. First, a comb drive for autofocus 330 delivers a degree of freedom of movement out of the plane of the MEMS structure of the actuator package 300. Second, a comb drive for optical image stabilization 340 delivers a degree of freedom of movement in the plane of the MEMS structure (the OIS comb). Also depicted in FIG. 3 are the four pre-deflection bodies 320 that are deflected out of the plane of the actuator package 300 and bonded in this position to the underlying support structure and to neighboring parts of actuator package 300. These pre-deflection bodies 320 are linked to the moving body by a leaf spring flexure (labeled in FIG. 4 with label omitted here for clarity and described below). These resilient leaf spring flexures substantially limit the relative motion between the moving body and the fixed body. The act of deflecting the pre-deflection body 320 rotates the moving body out of the plane actuator package 300. This deflected state then becomes the equilibrium position of the moving body.

In addition, the linkages 370 connecting one of the actuator structures to the image sensor 310 are highlighted. These take the form of an L-shaped linkage, one arm of which is thick and hence stiff (stiff linkage 360), and the other arm of which is thin and hence flexible (flexible linkage 350). In some embodiments, using standard integrated circuit (IC) processing techniques the electrical traces can be deposited on the MEMS device and along its leaf-spring flexures to route the electrical connections from the image sensor.

In some embodiments, the depicted arrangement solves a major technical hurdle that has prevented various proposed actuator solutions for miniature cameras in which the image sensor moves.

As one of skill in the art will readily understand in light of having read the present disclosure, embodiments are not limited to the illustrated embodiment, but include arrangements where the active actuator is not part of the MEMS structure labeled as actuator package 300. In some embodiments, the MEMS structure merely includes leaf-spring flexures to allow the desirable movement of the image sensor, and provides a means to route electrical connections off the image sensor, and the actuator is provided by some other means.

Nevertheless the embodiment illustrated herein does incorporate the actuator into the MEMS device. The actuator technology is the electrostatic comb drive. This works by using an array of interlocking fingers, where one half of the array is on a first substantially rigid body, and the other half is on a second substantially rigid body. The two bodies are suspended relative to each other on a series of resilient flexible leaf-springs that guide the relative motion between the two bodies. The arrangement of leaf-springs is chosen such that it is relatively compliant in desired directions of the comb, and relatively very stiff in undesired directions. For example, in some embodiments it is a necessary condition of successful operation that the leaf spring suspension prevents the interlocking comb fingers on the two bodies from ever touching each other. The comb operated by applying a voltage across the fingers on the two bodies to set up an electrostatic attraction. In other embodiments, this condition does not exist.

In some embodiments, electric field and capacitance between comb fingers are maximized by a smaller gap between the comb fingers and a greater the surface area that the fingers overlap. In some embodiments, the comb operates restricting the comb fingers from touching under the action of the electrostatic attraction, but allowing them to increase the amount of interlock, effectively increasing the surface area of array of parallel plate capacitors that are formed by the fingers.

A relative force between the two bodies is generated by the comb array in the direction that increases the overlap between the fingers. Considering one finger on one of the bodies in the middle of the array, either side of this finger there are two overlapping fingers from the other body. As an electrical voltage is applied between the finger arrays in the two bodies, the first finger is attracted by nominally the same force to the fingers on either side. Hence nominally there is no net force on the first finger in a direction that would cause the fingers to touch. However, the equilibrium in these touching directions is unstable. Since the electrostatic attraction is inversely proportional to the square of the gap between the fingers, a small perturbation towards one fingers would see the forces no longer in equilibrium, with the net force in the direction to move the finger in the same direction as the perturbation. For this reason, the resilient leaf-spring arrangement must be relatively very stiff in directions that would lead to the fingers touching.

As a guide, in some embodiments the resilient leaf-spring arrangement is roughly 70,000 times stiffer in directions that would lead to the fingers touching as compared to the direction of desired relative motion. In some embodiments, minimizing the gap between fingers, and minimizing the width of each finger allows more fingers with a higher electric field and hence a higher force for a given applied voltage. In some embodiments, force generated from the comb drive is proportional to the number of fingers, proportional to the square of the applied voltage and inversely proportional to the gap between fingers.

Some embodiments also how to integrate multiple comb drives designed to generate forces in different directions to deliver a device capable of moving the image sensor in six degrees of freedom. Some embodiments are described with the aid of the accompanying drawings. Some embodiments exploit the interlocking fingers of the Comb drive, and note that the fingers on the fixed side of the comb are not co-planar with the fingers on the moving side of the comb, because the generally planar structure of the actuator package 300 is oriented in the camera with its plane orthogonal to the optical axis of the lens.

In some embodiments, for the autofocus function, the lens element, and therefore the comb drive need to move out of the plane of the actuator package 300. It should be understood by one of ordinary skill in the art after having read the present description of embodiments that the comb drive is operated in a way that generates forces to increase the amount of interlock between the comb fingers without generating electrostatic forces that would tend to reduce the amount of interlock and force the fingers apart.

In some embodiments, it is thus advantageous for the equilibrium position of the autofocus comb to be with the two halves of the comb offset from each other along the optical axis, and then during operation by the application of a voltage across the fingers on the two halves of the comb, such that forces will be generated to pull the two halves of the comb back into alignment.

In some embodiments, a deflected portion (pre-deflection bodies 320) is deflected out of the plane of the actuator package 300 and bonded in this position to the underlying support structure and to neighboring parts of the actuator package 300. This deflected portion is linked to the moving body by a leaf spring flexure.

The moving body is suspended on the fixed body by means of two pairs of resilient leaf spring flexures. These resilient leaf spring flexures substantially limit the relative motion between the moving body and the fixed body to rotations about an axis. The act of deflecting the deflected portion rotates the moving body out of the plane of the actuator package 300. This deflected state then becomes the equilibrium position of the moving body. During operation, the application of a voltage across the two halves of the comb drive will generate forces that tend to pull the moving body back into the plane of the actuator package 300, rotating about the blue dashed axis.

These general principles of operation are similar in the present invention. FIGS. 4 to 12, which are discussed below. In the illustrated embodiments, it is assumed that the actuator package 300 and the image sensor are fabricated together from a single monolithic piece of silicon using various lithographic IC and MEMS processing techniques including etching, plating, deposition and implantation.

However, one of skill in the art will realize in light of having read the present disclosure that the included embodiments are not so limited. For manufacturing cost and yield issues, and constraints on the different required processing techniques, it may be more appropriate to fabricate the MEMS actuator separately from the image sensor and then use some kind of wafer bonding technique to join them together.

Figure 4:
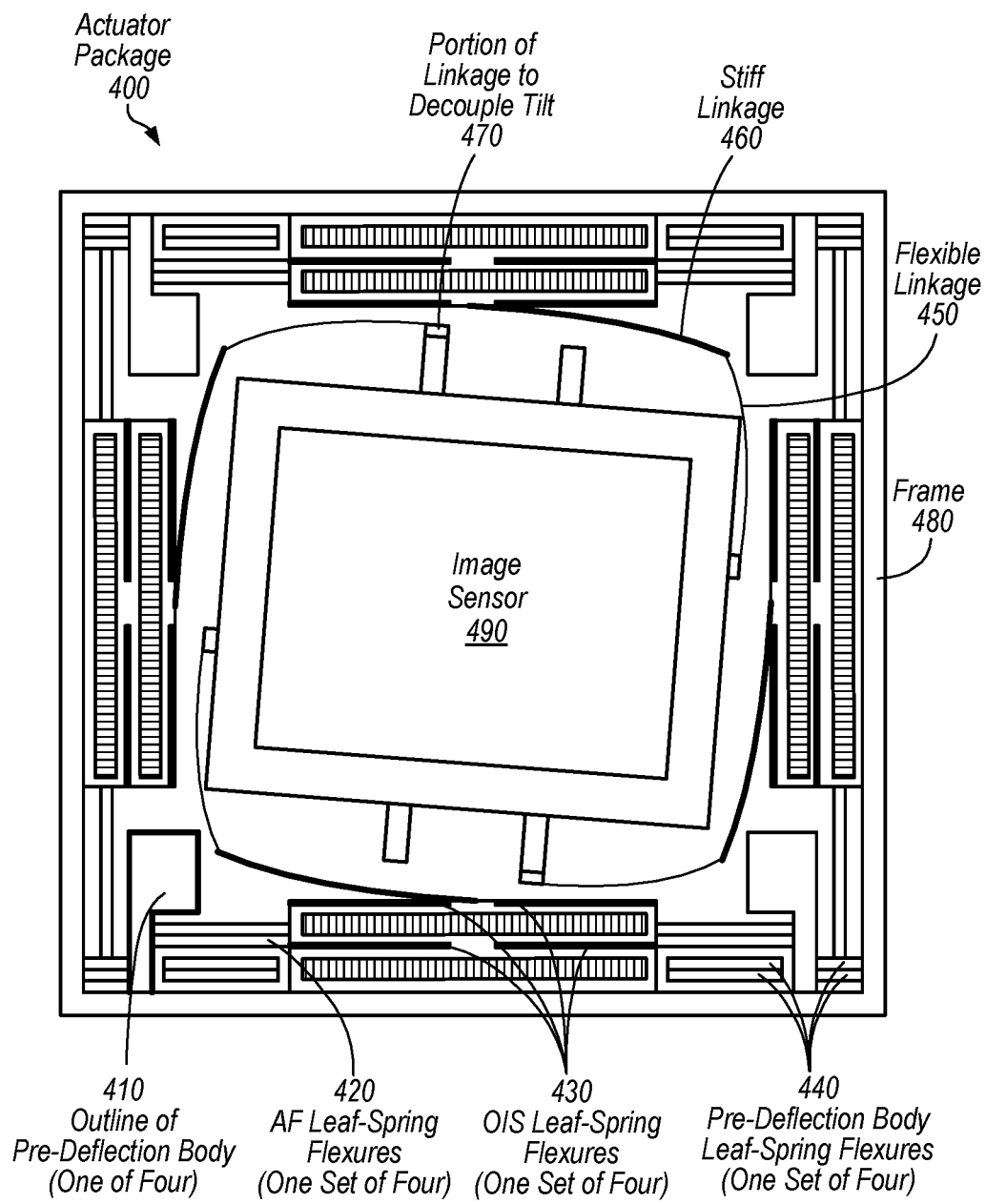
FIG. 4 depicts a plan view of a MEMS actuator for use with an image sensor according to some embodiments.

FIG. 4 depicts a plan view of a MEMS actuator for use with an image sensor according to some embodiments. Oriented such that, where the stiff and flexible arms of the L-shaped linkages can be more clearly observed. Note the outline of one of the pre-deflection bodies 410, of which there are four, one in each corner. Image sensor 490 is mounted on a linkage composed of a flexible linkage 450, a stiff linkage 460, and a portion of linkage to decouple tilt 470. In addition, FIG. 4 highlights three additional leaf-spring flexure arrangements, each consisting of four flexures. These arrangements are repeated on each side of the device.

A set of four pre-deflection body leaf-spring flexures 440 mounts the pre-deflection body to the fixed body that is the frame 480 around the complete device. These four pre-deflection body leaf-spring flexures 440 allow the pre-deflection body 410 to be deflected out of the plane of the actuator package 400, but also substantially prevent parasitic motions in the other five degrees of freedom during this deflection. These four pre-deflection body leaf-spring flexures 440 prevent the pre-deflection body 410 from tilting about any axis and from moving in linear directions in the plane of the actuator package 400.

A second set of four autofocus leaf-spring flexures 420 suspends the autofocus moving body between two of the pre-deflection bodies. These autofocus leaf-spring flexures 420 also substantially limit the motion of the autofocus moving body relative to the pre-deflection bodies to one degree of freedom: linear movements orthogonal to the plane of the actuator package 400. Other parasitic tilts and linear motions in the plane of the MEMS device are strongly resisted, providing in some embodiments the advantage that the autofocus moving body is completely suspended on the pre-deflection bodies 410, such that, at equilibrium, when the autofocus moving body is out of plane of the actuator package 400, the autofocus flexures are nominally undeflected.

In some embodiments, advantages to this approach relate to desire that the autofocus leaf-spring flexures 420 are at least 70,000 time stiffer to movements in the plane of the actuator package 400 as compared to movements out of plane. Other approaches might leave a deflected portion is linked to the moving body by a flexure that is adding to the spring stiffness out of plane, but is not helping the spring stiffness in plane and hence hindering the achievement of the required stiffness ration.

In some embodiments, other advantages to this approach relate to thickness of the actuator package 400. In some embodiments, the desired movement out of plane is 200 um to allow focusing from infinity to 10 cm object distance. For the current embodiment, the thickness of the Silicon in the actuator package 400 is 300 um. Therefore, to operate as desired, the autofocus moving body is deflected 200 um out of plane, and there will be a remaining 100 um of overlap between the two halves of the autofocus comb.

By way of contrast to the embodiment shown, if the pre-deflection bodies merely deflected the moving body of out plane, and there were separate flexures suspending the autofocus moving body on the fixed body, then considering the case where the individual stiffness of the four flexures suspending the moving body on the fixed boy were identical to the stiffnesses of the two extra flexures linked to the pre-deflection body, then the pre-deflection body might need to be deformed by 600 um out of plane so that the moving body deflects by the required 200 um, adding 400 um to the height of the device. Such an example is provided for the sake of understanding alternatives, and the flexure stiffness do not need to be identical, but nevertheless the principle illustrating the advantages over the example of the embodiment shown remains the same.

Hence the arrangement of illustrated embodiment, in which the autofocus moving body is suspended entirely on the pre-deflection bodies 410 provides advantages both in terms of the required stiffnesses and minimizing the height of the device. The third set of four flexures is the optical image stabilization leaf spring flexures 430 suspending the optical image stabilization (OIS) moving body onto the autofocus moving body (which is also the optical image stabilization fixed body).

Figure 5:
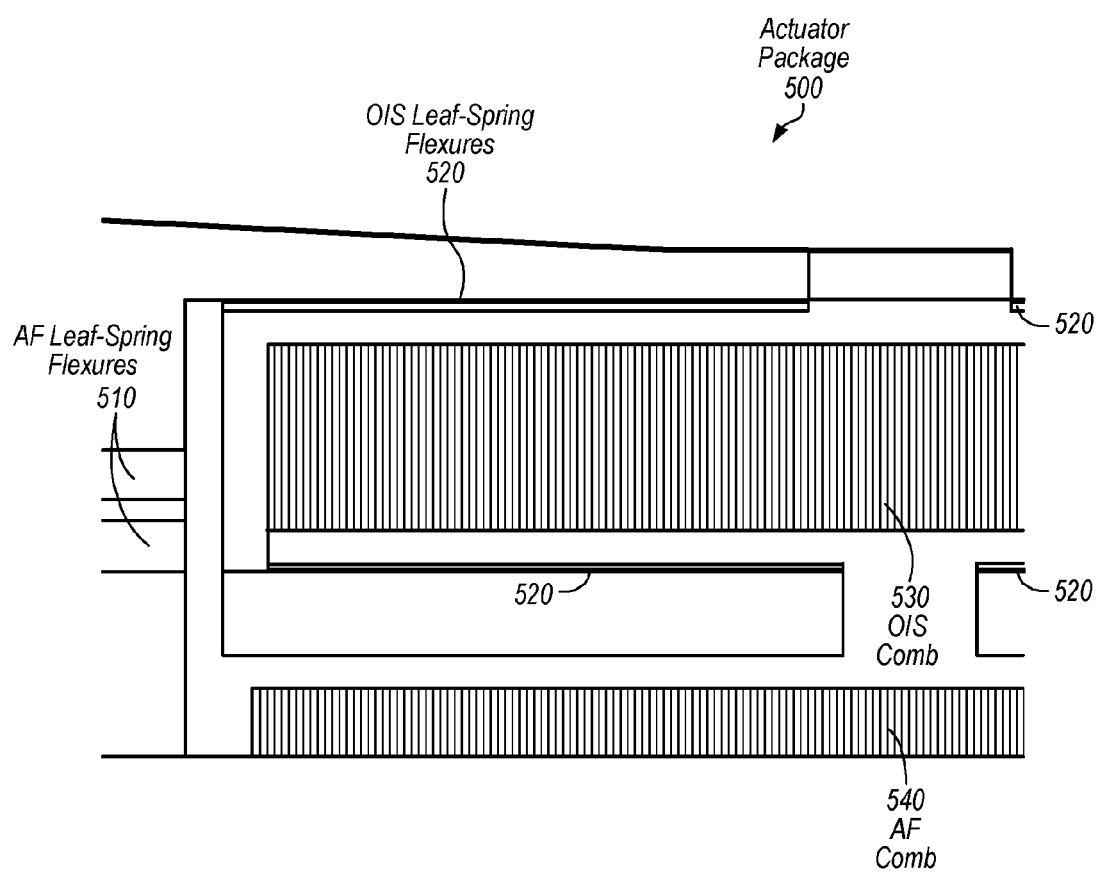
FIG. 5 illustrates a detail view of combs in a MEMS actuator for use with an image sensor according to some embodiments.

FIG. 5 illustrates a detail view of combs in a MEMS actuator for use with an image sensor according to some embodiments, including a zoomed-in plan view looking at part of the bottom of the actuator package 500 as viewed in FIG. 4. In FIG. 5, optical image stabilization leaf-spring flexures 520 are easier to observe, and optical image stabilization leaf-spring flexures 520 suspend the optical image stabilization moving body onto the autofocus moving body, which is also the optical image stabilization fixed body. There are four individual flexures in the set of optical image stabilization leaf-spring flexures 520. FIG. 5 shows two optical image stabilization leaf-spring flexures 520 in their entirety, the ends of the other two can be seem continuing off the right hand side of the illustration. FIG. 5 further shows the autofocus comb 540 and autofocus leaf spring flexures 510.

One of skill in the art will appreciate in light of having read the present disclosure that, in some embodiments, these optical image stabilization leaf-spring flexures 520 extend through the whole thickness of actuator package 500, and hence are very stiff and substantially prevent relative motions out of the plane of actuator package 500. In addition, based on the orientation of FIG. 5, optical image stabilization leaf-spring flexures 520 also substantially prevent relative horizontal motions that would cause the fingers of the two halves of the comb drive to touch, while still being much more compliant to vertical movements.

In FIG. 5, the optical image stabilization leaf-spring flexures 520 are shown straight, which is the undeflected stated. As can be observed, the fingers of the two halves of the optical image stabilization comb 530 have a relatively small overlap in this relaxed state. The application of a voltage across the two halves of the optical image stabilization comb 530 will tend to move the optical image stabilization comb 530 downwards (in the orientation of FIG. 5) to increase the interlocking of the fingers. As described above, the forces generated by the optical image stabilization comb 530 can only act in one direction. For this reason, the relaxed state of the optical image stabilization comb 530 is not with the comb in the center of travel, but is with the comb as one end of travel.

Therefore when operating the device, some embodiments power up each of the optical image stabilization combs 530 with a DC bias voltage so that they are operating around the center of travel. It is for this reason (when combined with the L-shaped linkages that suspend the image sensor on the optical image stabilization comb 530 actuator package 500 that the image sensor is rotated by a little over 2 degrees when the optical image stabilization combs 530 are in their relaxed state. This image sensor rotation can be observed in FIG. 4.

Returning briefly to FIG. 4, the purpose of the L-shaped linkages, with one arm stiff (stiff linkage 460), and one flexible (flexible linkage 450), is to decouple the motions of the different optical image stabilization actuators. One of skill in the art will appreciate in light of having read the present disclosure that, when viewed in the orientation of FIG. 4, the optical image stabilization actuator at the top and the optical image stabilization actuator at the bottom control the movement of the actuator up and down. The optical image stabilization actuators to the left and right control the movement of image sensor 490 to the left and right allowing decoupling of these motions, so that movements to the left and right substantially produce reduced disturbance the movements of the image sensor 490 and the up and down optical image stabilization actuators (and vice versa).

As may be appreciated, the L-shaped linkages with one stiff linkage 460 and one flexible linkage 450 achieve this decoupling in some embodiments. The stiff linkage 460 additionally provides, in some embodiments, a space-saving packaging feature so that each actuator structure can be centered on each side of the image sensor 490. The flexible linkage 450 is stiff along its length in the direction of the forces applied by the optical image stabilization actuator that is being linked, but is compliant in the 'in-plane' orthogonal direction that is being controlled by the orthogonal pair of optical image stabilization actuators.

Going one step further, if the optical image stabilization actuators are acting around mid-travel (which is actually illustrated in FIG. 8, discussed below), and hence the image sensor 490 is nominally squared up to the fixed frame surrounding the actuator package, then a differential mode signal between the two optical image stabilization actuators on opposite sides of the image sensor 490 will cause a linear movement, whereas a common mode signal will tend to rotate the image sensor about the optical axis.

Figure 8:
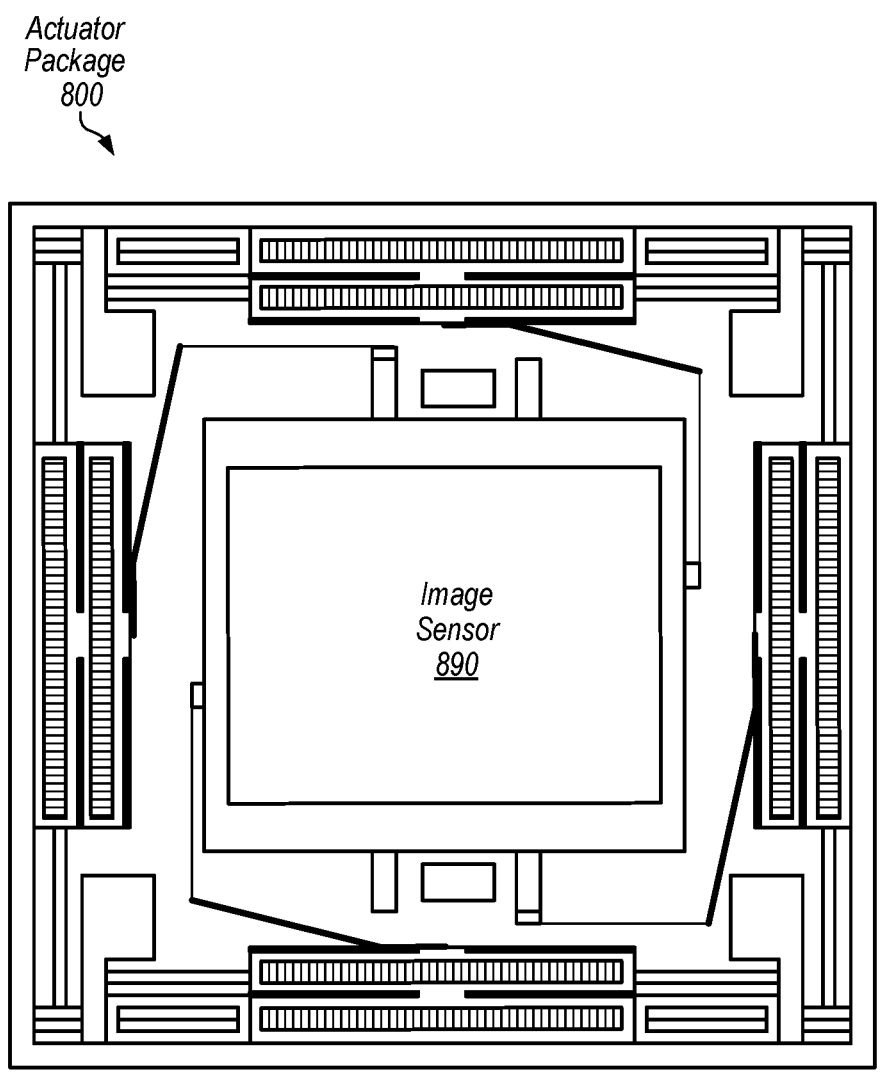
FIG. 8 depicts a MEMS actuator for use with an image sensor according to some embodiments with combs powered to mid-position and an image sensor squared and in mid-position.
Figure 9:
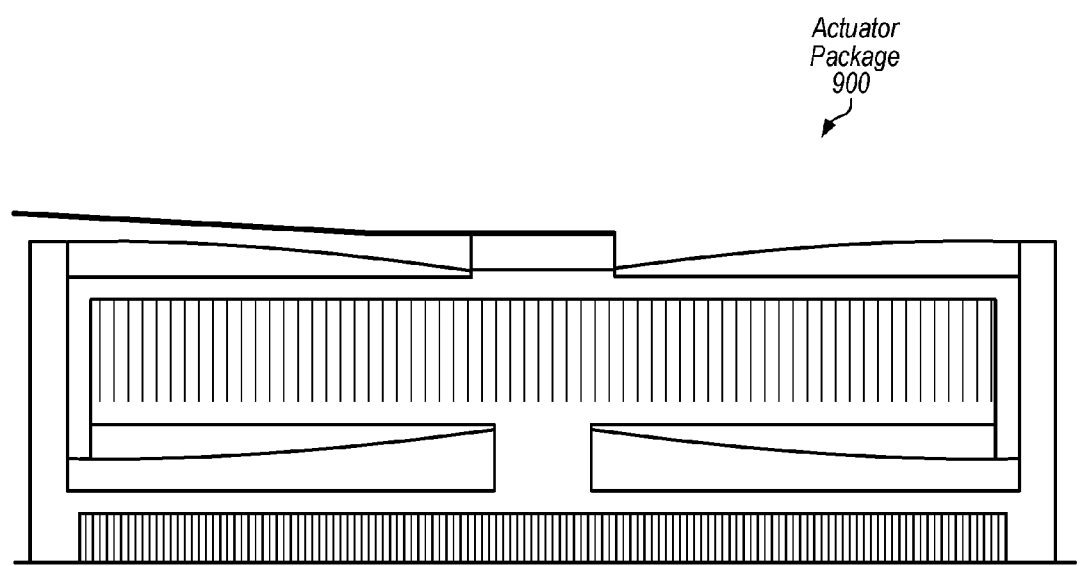
FIG. 9 illustrates a comb of a MEMS actuator for use with an image sensor according to some embodiments powered to mid-position.
Figure 10:
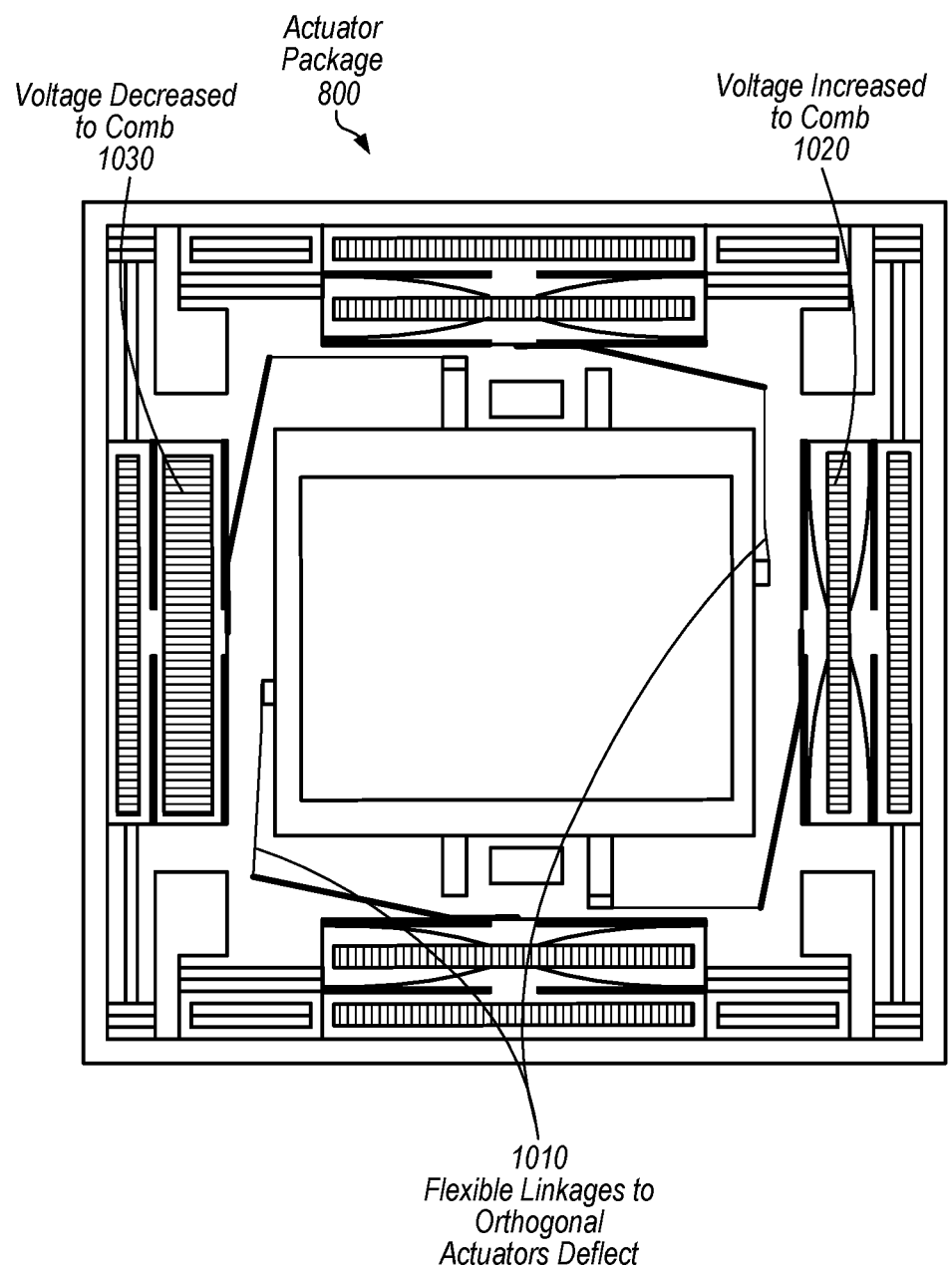
FIG. 10 depicts a MEMS actuator for use with an image sensor according to some embodiments with OIS movement.

More specifically Consider FIG. 8, FIG. 9 and FIG. 10. FIG. 8 depicts a MEMS actuator for use with an image sensor according to some embodiments with combs powered to mid-position and an image sensor squared and in mid-position. FIGS. 8 and 9 show plan views of the actuator package 800 and 900 with the optical image stabilization actuators biased with voltages across the combs so that they are in the center of travel. FIG. 9 shows a zoomed in view of one of the optical image stabilization actuators. The deflection of the optical image stabilization flexures may be observed. FIG. 9 illustrates a comb of a MEMS actuator for use with an image sensor according to some embodiments powered to mid-position. FIG. 10 depicts a MEMS actuator for use with an image sensor according to some embodiments with OIS movement. In FIG. 8, all OIS actuators are at their bias voltage, the image sensor 890 is square, and centered.

In moving to FIG. 10 and understanding the function of actuator package 1000, the voltage applied across the left hand optical image stabilization comb 1030 is decreased, and the voltage applied to the right hand comb 1020 is increased by the same amount (i.e. a differential signal), the image sensor 1090 experiences a force from both actuators to move to the right. In more detail, the force from the optical image stabilization actuator on the left 1030 is coming from the spring force of the flexures 1010 trying to straighten, since the comb force has been reduced, whilst the force from the optical image stabilization actuator on the right is coming from the electrostatic forces pulling the halves of the comb to interlock more, which is deflecting the optical image stabilization flexures further.

However, if there is a common mode signal to the optical image stabilization actuators, such as if the voltage to both is reduced from the bias voltage, this will tend to rotate the image sensor towards the state shown in FIG. 4. Conversely, if the voltage to the optical image stabilization actuators is increased to both, then the image sensor will tilt the other way.

As an aside, note that a common mode voltage offset (from the bias voltage) applied to the up and down OIS actuators, which acts to rotate the image sensor in one direction, could fight against a common mode voltage of opposite sign applied to the left and right optical image stabilization actuators, which acts to rotate the image sensor in the other direction. This is an example of one of the two extra degrees of freedom of the system that could lead to internal stresses in the actuator if not correctly controlled.

The functions of various features of one embodiment have now been described in general terms. The remaining description and illustrations describe more detailed feature design and secondary features.

Figure 6:
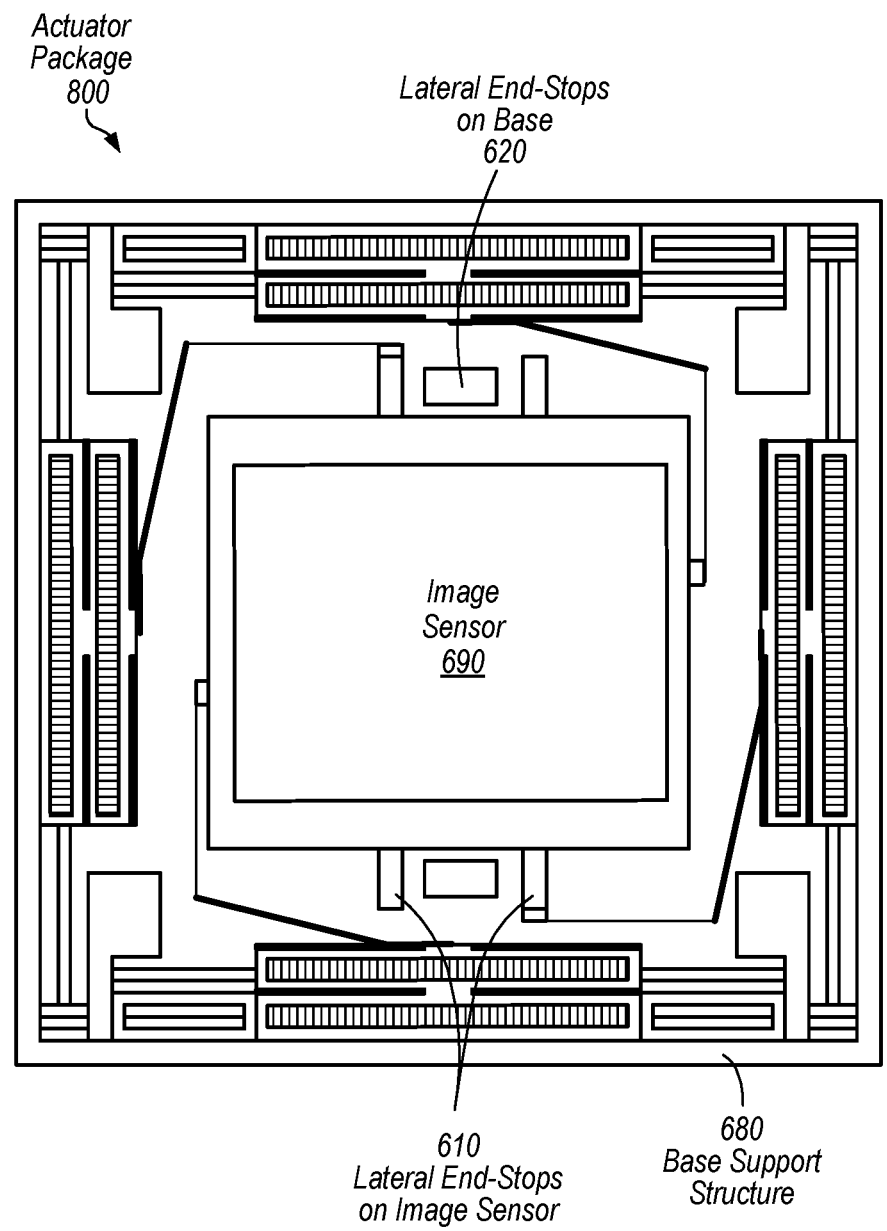
FIG. 6 depicts a MEMS actuator for use with an image sensor according to some embodiments.

FIG. 6 depicts a MEMS actuator for use with an image sensor according to some embodiments. FIG. 6 shows that the actuator package 600 and the image sensor 690 are mounted onto a base support structure 680 with two lateral end stops 620 that limit the travel of image sensor 690 in the plane of the actuator package 600. Base support structure 680 also provides a surface to which pre-deflection bodies are bonded, and forms the lower end-stop to motions out-of-plane. Motion in plane is arrested by lateral end stops on base 620 and lateral end stops on image sensor 610. In some embodiments, these end stops arrest sudden lateral motion.

Figure 7:
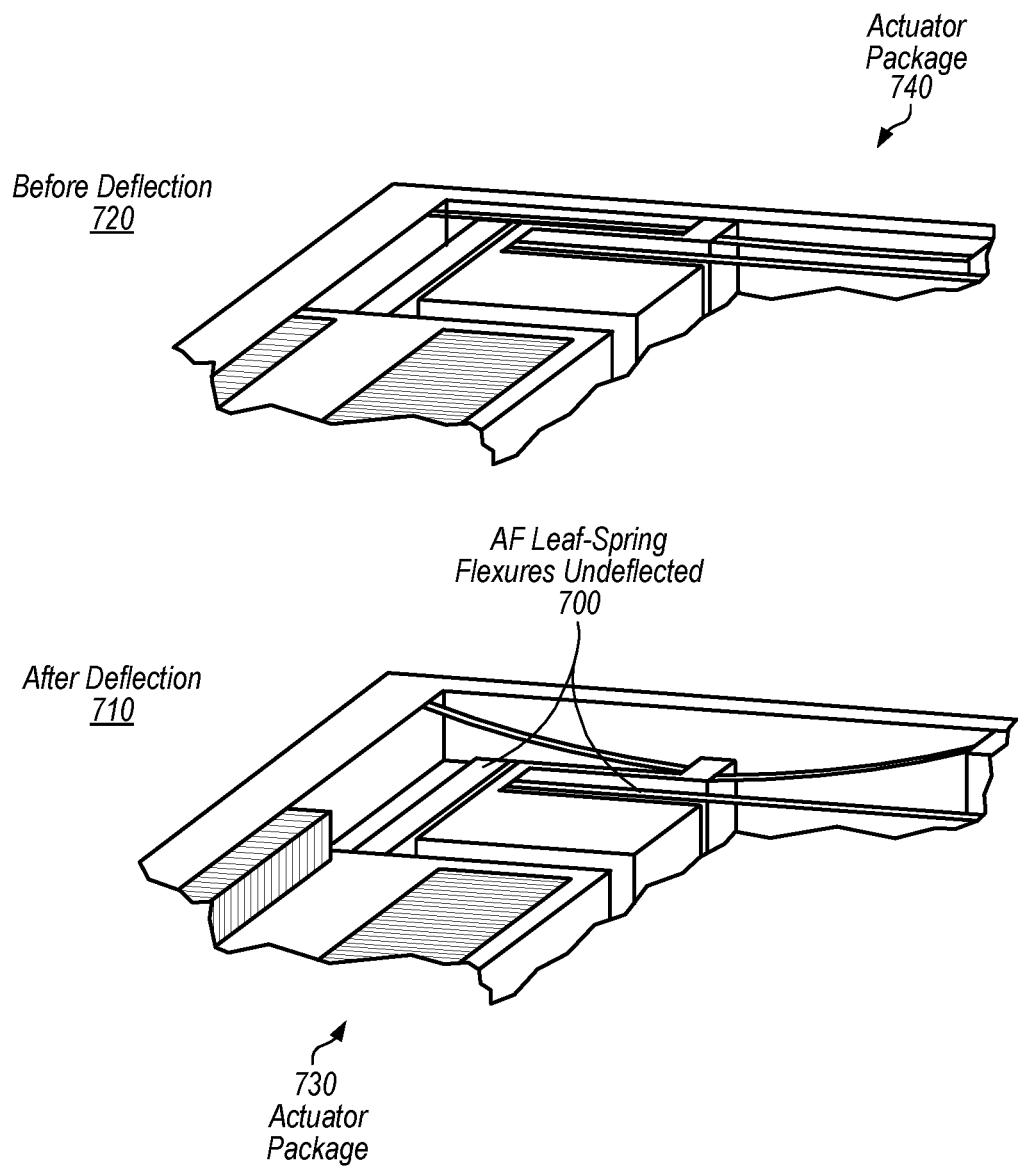
FIG. 7 illustrates deflection of a MEMS actuator for use with an image sensor according to some embodiments.

FIG. 7 illustrates deflection of a MEMS actuator for use with an image sensor according to some embodiments. FIG. gives two detailed perspective views showing one corner of the actuator package 730 and 740 before 720 and after 710 the pre-deflection bodies are deflected downwards to be bonded to the base and the surrounding fixed body of the actuator package 730 and 740. Notice that the autofocus flexures remain undeflected 700 before and after the deflection of the pre-deflection bodies (although the flexures suspending the pre-deflection bodies to the fixed body do deflect). Also notice that the act of deflecting the pre-deflection bodies shifts the autofocus moving body downwards offsetting the two halves of the autofocus comb fingers, and indeed shifting the optical image stabilization actuators and image sensor down as well.

Figure 11:
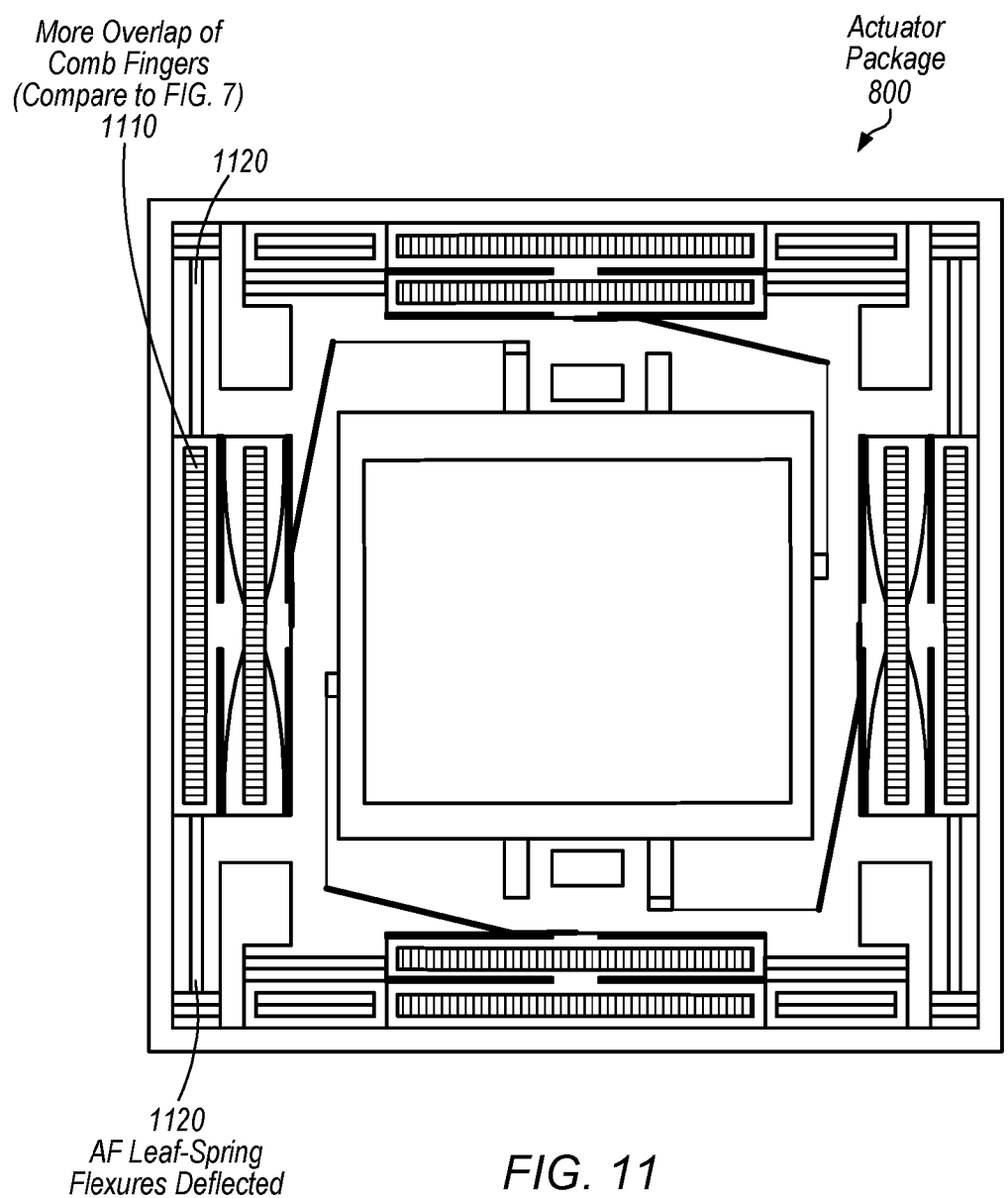
FIG. 11 illustrates a MEMS actuator for use with an image sensor according to some embodiments with AF movement to lift an image sensor.

FIG. 11 illustrates a MEMS actuator for use with an image sensor according to some embodiments with autofocus movement to lift an image sensor. FIG. 11 shows a perspective view, in which the autofocus actuators are powered with voltages across the combs, and hence the image sensor is lifted towards macro focus. If the four autofocus actuators are driven with common-mode voltages, this alters the position of the image sensor orthogonally to the plane of the actuator package, which is along the optical axis, adjusting focus. However, differential signals are applied to the different autofocus actuators, this allows the position of each side of the image sensor along the optical axis to be controlled separately, which will tilt the image sensor. In order for this to operate correctly, some embodiment decouple the linkages suspending the image sensor on the optical image stabilization actuators to allow these tilting degrees of freedom. These tilt decoupling linkage features are annotated in FIG. 4, and shown in more detail in FIG. 12 (described below). The amount of tilt is very small (0.2 to 0.3 degrees), and if these linkages are very flexible they can have a detrimental effect on the transmission of the autofocus displacements. Hence, in some embodiments these decoupling features are very small. Note that the autofocus leaf spring flexures are deflected 1120 and overlap of comb fingers is increased.

In some embodiments, the actuator described herein has eight separately controllable comb drives, each driven with a voltage. In the embodiment described herein, each comb drive is driven with an independently controllable voltage drive, with applied voltages adjustable up to 40V. However, since each comb drive is essentially a pure capacitor, the required drive current is very small, and the drive power can also be very small; dominated by the quiescent power in the driver itself, that can be optimized for driving such capacitive loads.

Since the drive voltage is 40V, it is this factor more than any other that is likely to lead to the MEMS device being fabricated separately from the image sensor, using a different integrated circuit process.

However, in some embodiments, the actuator package 1100 includes traces along its various leaf spring flexures to route the many and various electrical signals between the image sensor and the fixed portion of the actuator package 1100. This fixed portion of the actuator package 1100 is mounted on a substrate structure to mechanically and electrically connect the actuator package 1100 and image sensor to the wider system. Options include flip-chip bonding the actuator package 1100 to a ceramic substrate.

Figure 12:
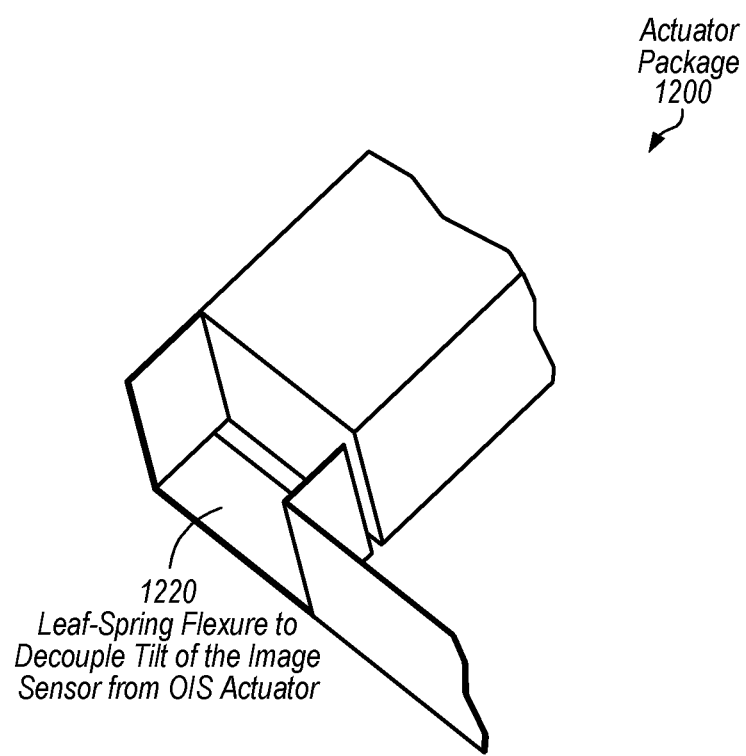
FIG. 12 depicts a MEMS actuator leaf-spring flexure for use with an image sensor according to some embodiments.

FIG. 12 depicts a MEMS actuator leaf-spring flexure for use with an image sensor according to some embodiments. Note leaf-spring flexure to decouple tilt 1220 on actuator package 1200.

Example Computer System

Figure 13:
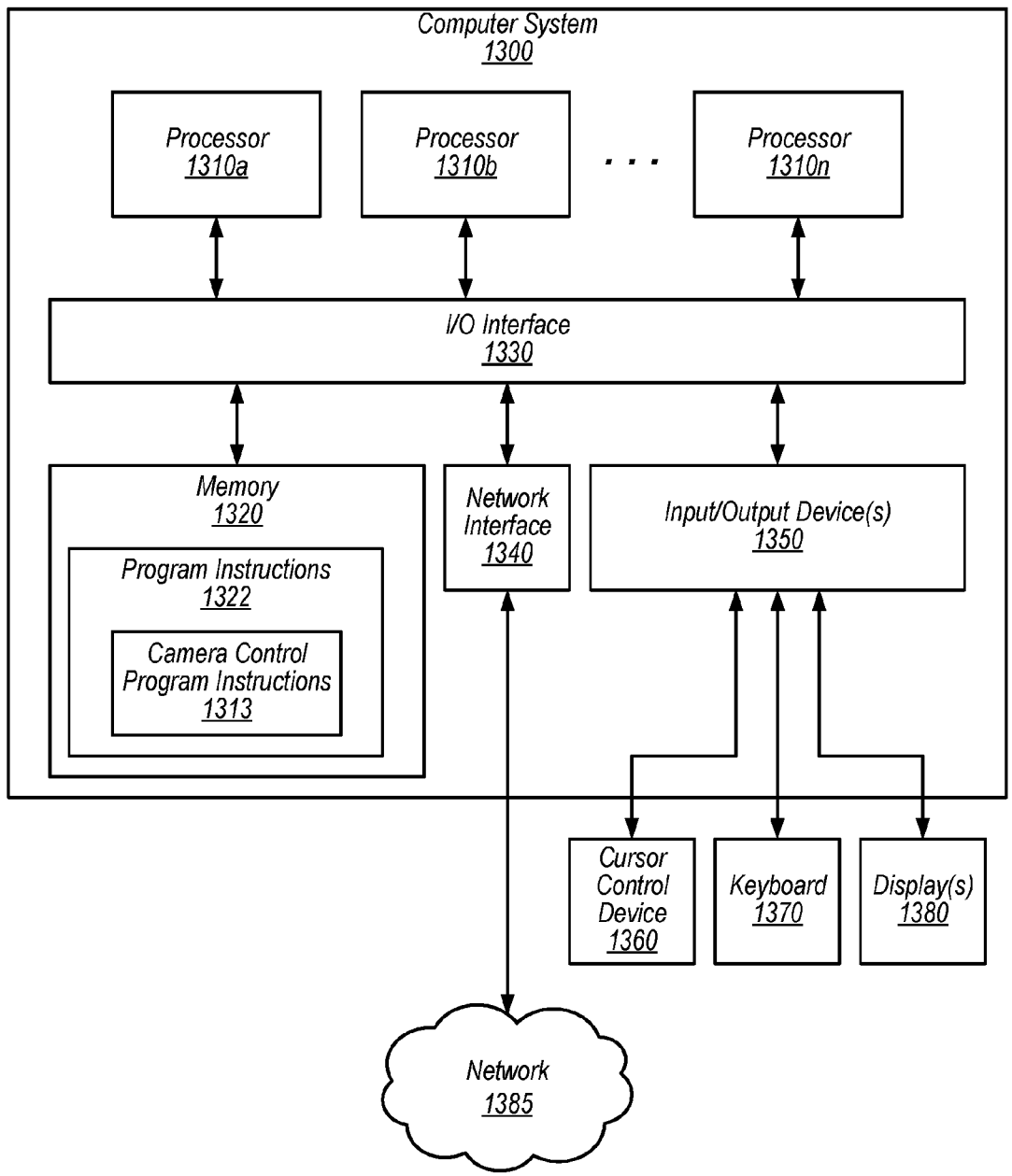
FIG. 13 illustrates an example computer system configured to implement aspects of the system and method for camera control, according to some embodiments.

FIG. 13 illustrates computer system 1300 that is configured to execute any or all of the embodiments described above. In different embodiments, computer system 1300 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, may be executed in one or more computer systems 1300, which may interact with various other devices. Note that any component, action, or functionality described above with respect to FIGS. 1-20 may be implemented on one or more computers configured as computer system 1300 of FIG. 13, according to various embodiments. In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some cases, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs), such as the x813, PowerPC, SPARC, or MIPS ISAs, or any other suitable ISA. In multiprocessor systems, each of processors 1310 may commonly, but not necessarily, implement the same ISA.

System memory 1320 may be configured to store camera control program instructions 1322 and/or camera control data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions 1322 may be configured to implement a lens control application 1324 incorporating any of the functionality described above. Additionally, existing camera control data 1332 of memory 1320 may include any of the information or data structures described above. In some embodiments, program instructions and/or data may be received, sent or stored upon different types of computer-accessible media or on similar media separate from system memory 1320 or computer system 1300. While computer system 1300 is described as implementing the functionality of functional blocks of previous Figures, any of the functionality described herein may be implemented via such a computer system.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network 1385 (e.g., carrier or agent devices) or between nodes of computer system 1300. Network 1385 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or accessing data by one or more computer systems 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1322, which may be processor-executable to implement any element or action described above. In one embodiment, the program instructions may implement the methods described above. In other embodiments, different elements and data may be included. Note that data may include any data or information described above.

Those skilled in the art will appreciate that computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An actuator assembly for mounting a digital image sensor, comprising:
 a base frame member;
 an image sensor; and
 a plurality of comb drive actuators affixed to the base frame member by a plurality of respective leaf spring flexures, wherein
  the respective leaf spring flexures provide forces to move the image sensor relative to the base frame member along an optical axis of the image sensor, a first orthogonal axis orthogonal to the image sensor, and a second orthogonal axis orthogonal to both the first orthogonal axis and the optical axis, and
  the respective leaf spring flexures provide forces to move the image sensor relative to the base frame member in roll directions relative to each of the optical axis, the first orthogonal axis, and the second orthogonal axis.

2. The actuator assembly for mounting a digital image sensor of claim 1, wherein
 each of the plurality of comb drive actuators comprises at least two independent comb drive array portions, wherein
  at least one of the comb drive array portions generates force tending to move the image sensor out of a plane of the base frame member, and
  another of the comb drive array portions generates force tending to move the image sensor in one linear direction within the plane of the base frame member.

3. The actuator assembly for mounting a digital image sensor of claim 2, wherein
 each of the four functionally similar comb drive actuator structures comprises a substantially rigid portion with interdigitated comb drive fingers from the respective at least one of the comb drive arrays and the respective another of the comb drive arrays.

4. The actuator assembly for mounting a digital image sensor of claim 2, wherein for each of the plurality of comb drive actuators, a moving portion of the comb drive actuator that delivers in-plane force is suspended on a moving portion of the comb drive actuator that delivers out-of plane forces.

5. The actuator assembly for mounting a digital image sensor of claim 2, further comprising:
a plurality of substantially rigid portions of the actuator assembly suspended using resilient flexures to the base frame member, each of which suspends a respective another of the comb drive array portions to deliver out-of-plane forces, wherein
the plurality of substantially rigid portions are deflected out of the plane of the plane of the base frame member during the fabrication process, and
the plurality of substantially rigid portions are bonded in deflected positions so as to deflect the respective another of the comb drive array portions to deliver the out-of-plane forces.

6. The actuator assembly for mounting a digital image sensor of claim 1, wherein
the plurality of comb drive actuators affixed to the base frame member further comprises four functionally similar comb drive actuator structures.

7. The actuator assembly for mounting a digital image sensor of claim 1, wherein
each of the comb drive actuators is linked to the image sensor by a linkage arrangement that comprises:
a substantially rigid linking bar, and
a further beam angled to the rigid bar that is compliant to one linear direction of in-plane movement and stiff to the orthogonal direction of in-plane movement, wherein
the orthogonal direction of in-plane movement is a same direction as the forces provided by the in-plane actuator to which it is attached.

8. A digital camera, comprising:
a base frame member;
a lens;
an image sensor; and
a plurality of comb drive actuators affixed to the base frame member by a plurality of respective flexures, wherein each of the plurality of comb drive actuators comprises at least two independent comb drive array portions, wherein
at least one of the comb drive array portions generates force tending to move the image sensor out of a plane of the base frame member, and
another of the comb drive array portions generates force tending to move the image sensor in one linear direction within the plane of the base frame member, such that the plurality of comb drive actuators provide respective forces to move the image sensor relative to the lens in six degrees of freedom.

9. The digital camera of claim 8, wherein
the respective flexures comprise electrically conductive flexures.

10. The digital camera of claim 9, wherein
each of the four functionally similar comb drive actuator structures comprises a substantially rigid portion with interdigitated comb drive fingers from the respective at least one of the comb drive arrays and the respective another of the comb drive arrays.

11. The digital camera of claim 9, wherein
for each of the plurality of comb drive actuators, a moving portion of the comb drive actuator that delivers in-plane force is suspended on a moving portion of the comb drive actuator that delivers out-of plane forces.

12. The digital camera of claim 9 further comprising:
a plurality of substantially rigid portions of the actuator assembly suspended using resilient flexures to the base frame member, each of which suspends a respective another of the comb drive array portions to deliver out-of-plane forces, wherein
the plurality of substantially rigid portions are deflected out of the plane of the plane of the base frame member during the fabrication process, and
the plurality of substantially rigid portions are bonded in deflected positions so as to deflect the respective another of the comb drive array portions to deliver the out-of-plane forces.

13. The digital camera of claim 8, wherein
the plurality of comb drive actuators affixed to the base frame member further comprises four functionally similar comb drive actuator structures.

14. The digital camera of claim 8, wherein
each of the comb drive actuators is linked to the image sensor by a linkage arrangement that comprises:
a substantially rigid linking bar, and
a further beam angled to the rigid bar that is compliant to one linear direction of in-plane movement and stiff to the orthogonal direction of in-plane movement, wherein
the orthogonal direction of in-plane movement is a same direction as the forces provided by the in-plane actuator to which it is attached.

15. An actuator package, comprising:
a base frame member;
an image sensor; and
a plurality of comb drive actuators affixed to the base frame member by a
plurality of respective flexures, wherein the plurality of comb drive actuators comprises four comb drive actuator structures,
each of the four comb drive actuator structures comprises a substantially rigid portion with interdigitated comb drive fingers from the respective at least one of the comb drive arrays and the respective another of the comb drive arrays,
for each of the plurality of comb drive actuator structures, a moving portion of the comb drive actuator that delivers in-plane force is suspended on a moving portion of the comb drive actuator that delivers out-of plane forces, and the plurality of comb drive actuators provide respective forces to move the image sensor relative to the lens in six degrees of freedom.

16. The actuator package of claim 15, wherein
each of the plurality of comb drive actuators comprises at least two independent comb drive array portions, wherein
at least one of the comb drive array portions generates force tending to move the image sensor out of a plane of the base frame member, and
another of the comb drive array portions generates force tending to move the image sensor in one linear direction within the plane of the base frame member.

17. The actuator package of claim 16, further comprising:
a plurality of substantially rigid portions of the actuator assembly suspended using resilient flexures to the base frame member, each of which suspends a respective another of the comb drive array portions to deliver out-of-plane forces, wherein
the plurality of substantially rigid portions are deflected out of the plane of the plane of the base frame member during the fabrication process.

18. The actuator package of claim 15, wherein
each of the comb drive actuators is linked to the image sensor by a linkage arrangement that comprises:
a substantially rigid linking bar, and
a further beam angled to the rigid bar that is compliant to one linear direction of in-plane movement and stiff to the orthogonal direction of in-plane movement, wherein
the orthogonal direction of in-plane movement is a same direction as the forces provided by the in-plane actuator to which it is attached.

19. The actuator package of claim 15, wherein
the plurality of substantially rigid portions are bonded in deflected positions so as to deflect the respective another of the comb drive array portions to deliver the out-of-plane forces.

\* \* \* \* \*